United States Patent
Foley et al.

(10) Patent No.: US 10,365,983 B1
(45) Date of Patent: Jul. 30, 2019

(54) REPAIRING RAID SYSTEMS AT PER-STRIPE GRANULARITY

(71) Applicant: EMC IP Holding Company LLC, Hopkinton, MA (US)

(72) Inventors: Robert P. Foley, Clinton, MA (US); Peter Puhov, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 15/499,102

(22) Filed: Apr. 27, 2017

(51) Int. Cl.
*G06F 11/00* (2006.01)
*G06F 11/20* (2006.01)

(52) U.S. Cl.
CPC .... *G06F 11/2094* (2013.01); *G06F 2201/805* (2013.01); *G06F 2201/82* (2013.01)

(58) Field of Classification Search
CPC ........... G06F 11/2094; G06F 2201/805; G06F 2201/82
See application file for complete search history.

(56) References Cited

U.S. PATENT DOCUMENTS

| | | | | |
|---|---|---|---|---|
| 6,405,284 | B1 * | 6/2002 | Bridge | G06F 3/0608 |
| | | | | 711/114 |
| 9,354,975 | B2 | 5/2016 | Aliev et al. | |
| 9,690,660 | B1 | 6/2017 | Robins et al. | |
| 9,804,939 | B1 | 10/2017 | Bono et al. | |
| 10,073,621 | B1 * | 9/2018 | Foley | G06F 11/1076 |
| 2010/0306466 | A1 * | 12/2010 | Li | G06F 11/1662 |
| | | | | 711/114 |
| 2011/0264949 | A1 * | 10/2011 | Ikeuchi | G06F 11/1076 |
| | | | | 714/6.22 |
| 2014/0089730 | A1 * | 3/2014 | Watanabe | G06F 11/1092 |
| | | | | 714/6.22 |
| 2014/0215262 | A1 * | 7/2014 | Li | G06F 11/0727 |
| | | | | 714/6.21 |
| 2014/0281689 | A1 * | 9/2014 | Fischer | G06F 11/1092 |
| | | | | 714/6.22 |
| 2016/0041906 | A1 * | 2/2016 | Mukherjee | G06F 16/221 |
| | | | | 711/119 |
| 2016/0170833 | A1 * | 6/2016 | Segura | G06F 11/1088 |
| | | | | 714/6.23 |

(Continued)

OTHER PUBLICATIONS

Robert P. Foley, et al.; "Selective Raid Repair Based on Content Mapping," U.S. Appl. No. 15/281,951, filed Sep. 30, 2016.

*Primary Examiner* — Marc Duncan
*Assistant Examiner* — Jonathan D Gibson
(74) *Attorney, Agent, or Firm* — BainwoodHuang

(57) ABSTRACT

A technique for managing RAID (Redundant Array of Independent Disks) storage includes maintaining active-stripe metadata that stores, for each of multiple stripes that have been written by a RAID system, an entry that identifies the stripe and identifies a respective configuration plan in effect a last time the stripe was written. In response to a disk drive failure, the technique further includes generating a set of new plans that specify disk drive elements to be used in place of damaged ones and performing a selective repair operation. The selective repair operation iterates over a set of entries in the active-stripe metadata, performs a comparison between the identified plan for each stripe and a current plan implemented by the RAID system for writing to that stripe, and repairs the stripe when the identified plan and the current plan are different.

17 Claims, 6 Drawing Sheets

(56) References Cited

U.S. PATENT DOCUMENTS

2016/0364181 A1\* 12/2016 McGlaughlin ...... G06F 11/1012
2017/0024142 A1\* 1/2017 Watanabe ................. G06F 3/06
2017/0091056 A1\* 3/2017 Watanabe ........... G06F 11/2069

\* cited by examiner

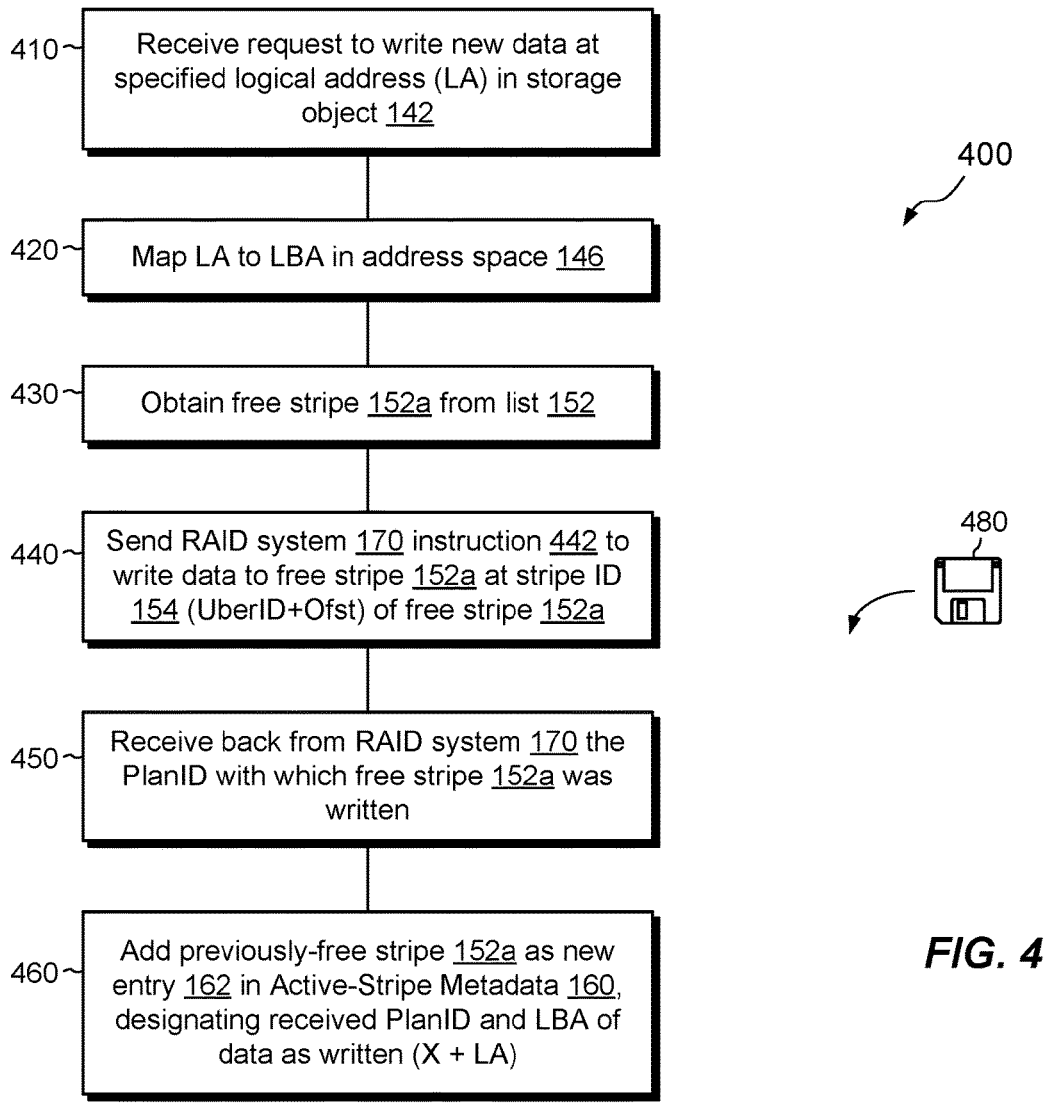
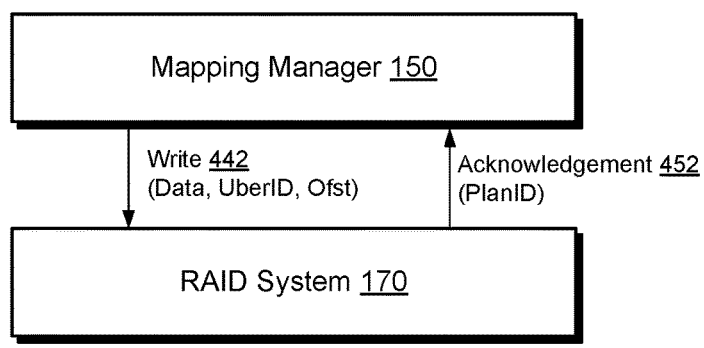
FIG. 4
FIG. 4a

REPAIRING RAID SYSTEMS AT PER-STRIPE GRANULARITY

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly provide disk drives in arrangements called "RAID groups" (RAID is an acronym for Redundant Array of Independent Disks). Common RAID configurations mirror data between disk drives and/or provide parity segments to establish redundancy. Mirroring and parity enable a RAID group to suffer a failure of a disk drive without experiencing data loss. For example, a system using RAID mirroring may access data of a failed disk drive from a surviving mirror drive. A system using parity may compute missing data based on a combination of data from surviving drives, e.g., by performing exclusive-OR operations on corresponding elements of the surviving drives.

When a disk drive in a RAID group fails, RAID protocols may initiate a repair operation. For example, a system may swap out the failed drive with a spare and begin copying data to the spare drive. In cases where parity is used, the system may compute data for the spare drive from remaining drives and store the computed data in the spare drive. These actions have the effect of restoring redundancy to the RAID group, such that it can suffer another disk drive failure without experiencing data loss.

SUMMARY

Unfortunately, conventional approaches for repairing RAID groups after disk drive failures can be burdensome. For example, consider a common RAID 5 arrangement that includes three or more disk drives with single parity. If one of the disk drives fails and a spare disk drive takes its place, than a data storage system would read each stripe segment from all remaining original drives, compute repair data as the bitwise exclusive-OR of all data in the corresponding segments, and write the computed repair data to the spare drive. The data storage system may perform these acts while it is also busy performing essential functions of servicing host requests, e.g., to read and write host data. Under these conditions, it is not unusual for a data storage system to require weeks of elapsed time to rebuild a spare drive. While this occurs, the RAID group may be vulnerable to a single point of failure. For example, if a second disk drive in the RAID group were to fail before the system could finish rebuilding the spare, some data would be irretrievably lost, as the redundancy afforded by single parity would be insufficient to completely reconstruct the data of both failed drives.

Not only does rebuilding RAID groups consume large amounts of time and risk data loss, it also subjects spare disk drives to large numbers of writes. As is known, flash drives, a type of electronic media for persistently storing data, have physical properties that limit the total number of writes they can perform before they become unreliable. If a system uses flash drives as spares, then large numbers of writes that accompany RAID rebuild can adversely affect the lifespans of the flash drives.

Moreover, many writes to spare drives may not even be needed. For example, a RAID group may store only a small amount of data at a few locations. Yet conventional rebuild schemes usually overwrite the entire extent of the spare drive, regardless of how much space is actually filled with data.

In contrast with prior approaches, which can be time consuming, prone to data loss, and susceptible to excessive writes to flash drives, an improved technique for managing RAID (Redundant Array of Independent Disks) storage maintains active-stripe metadata that associates multiple stripes that have been written by a RAID system with corresponding identifiers of plans, where each plan provides a configuration of disk drive elements in place when the respective stripe was last written. In response to a disk drive failure, the RAID system generates a set of new plans, which reflect configuration changes in which spare drive elements are exchanged for damaged ones, and performs a selective repair operation. The selective repair operation iterates over a set of stripes listed in the active-stripe metadata, compares the last-written plan listed for each stripe with a current plan for that stripe, and repairs the stripe only if the listed plan is different from the current plan.

Advantageously, the improved technique limits repair operations to only those stripes that have actually been written. Stripes that have not been written are excluded from the scope of repair, greatly reducing the amount of repair activity required in sparsely-written systems. Repair can thus proceed more quickly than with prior approaches and at much lower cost in terms of computing resources and numbers of disk accesses. As repair proceeds more quickly, vulnerability to data loss decreases proportionally. Further, selective repair operations involve fewer writes to spare disk elements, thus preserving lifespans of spare flash drives.

Certain embodiments are directed to a method of managing RAID (Redundant Array of Independent Disks) storage. The method includes maintaining active-stripe metadata that stores, for each of multiple stripes that have been written by a RAID system, an entry that identifies the stripe and identifies a respective plan in effect a last time the stripe was written, the plan for each stripe describing a configuration of disk drive elements that back the stripe. In response to a failure in a disk drive managed by the RAID system, the method further includes (i) generating a set of new plans that specify disk drive elements to be used in place of damaged ones and (ii) performing a selective repair operation. The selective repair operation iterates over a set of entries in the active-stripe metadata and, for each of the set of entries, (i) performs a comparison between the identified plan for the respective stripe and a current plan implemented by the RAID system for writing to that stripe and (ii) repairs the stripe in response to the comparison indicating that the identified plan and the current plan are different.

Other embodiments are directed to a data storage system constructed and arranged to perform a method of managing RAID storage, such as the method described above. Still other embodiments are directed to a computer program product. The computer program product stores instructions which, when executed on control circuitry of a data storage system, cause the data storage system to perform a method of managing RAID storage, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 is a flowchart showing an example method for writing data in the environment of FIG. 1.

FIG. 4a is a block diagram showing an example arrangement for performing write operations.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing RAID (Redundant Array of Independent Disks) storage maintains active-stripe metadata that associates multiple stripes that have been written by a RAID system with corresponding identifiers of plans, where each plan provides a configuration of disk drive elements in place when the respective stripe was last written. In response to a disk drive failure, the RAID system generates a set of new plans, which reflect configuration changes in which spare drive elements are exchanged for damaged ones, and performs a selective repair operation. The selective repair operation iterates over a set of stripes listed in the active-stripe metadata, compares the plan listed for each stripe with a current plan for that stripe, and repairs the stripe only if the listed plan is different from the current plan.

Figure 1:
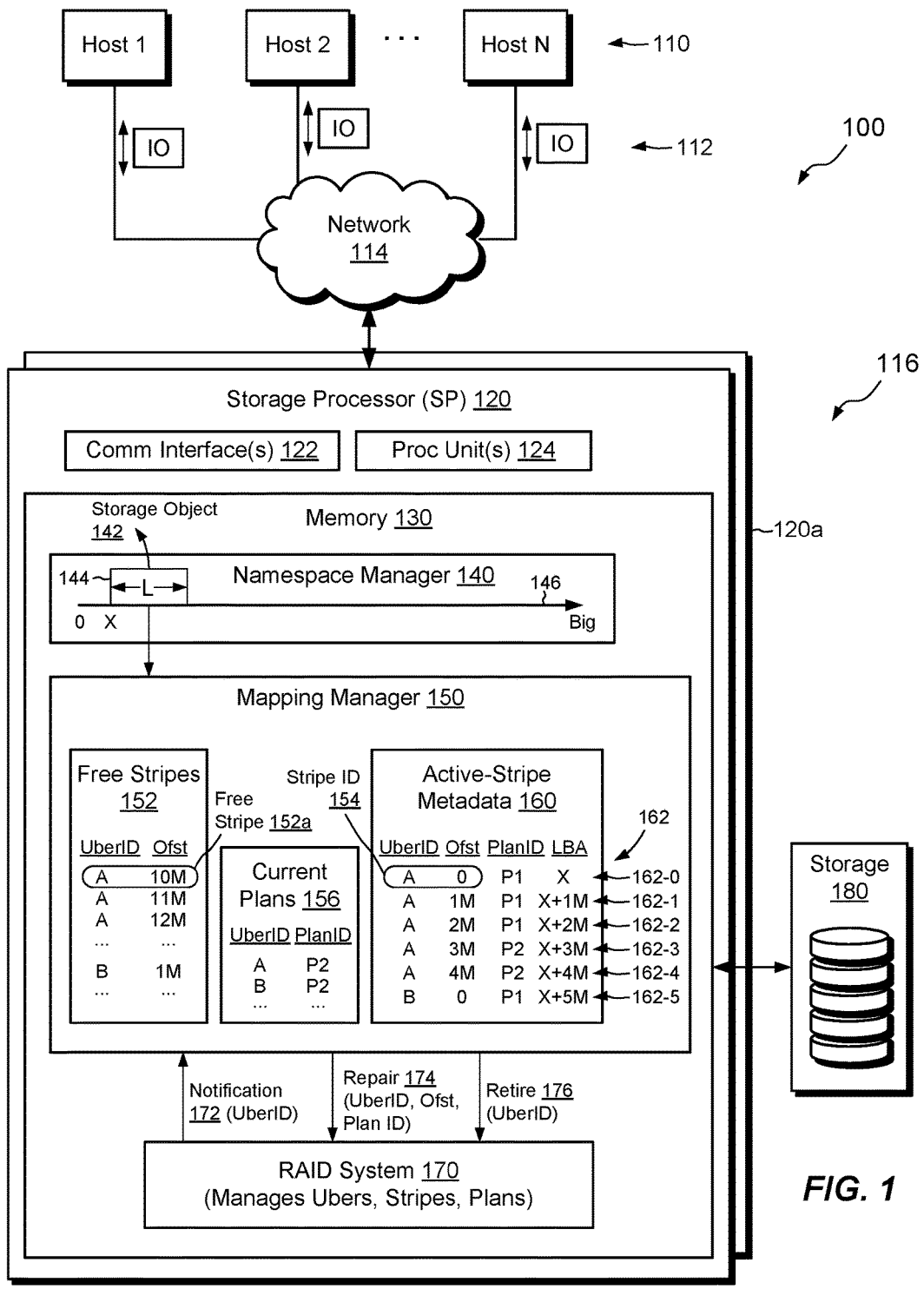
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180, such as magnetic disk drives, electronic flash drives, and the like. The storage 180 may be organized in RAID groups and/or in a fully-mapped RAID system. Within this document, the terms "disk drive," "disk," and "drive" may be used interchangeably for referring to any type of non-volatile storage device, regardless of whether there is any physical disk present.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI (Internet small computer system interface), NFS (network file system), and CIFS (common Internet file system), for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112, according to block-based and/or file-based protocols, and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a namespace manager 140, a mapping manager 150, and a RAID system 170. The namespace manager 140 maintains a namespace of storage objects accessible to hosts 110. For example, the namespace manager 140 exposes a storage object 142, which corresponds to a contiguous range 144 in a logical address space 146, which ranges from zero to a large number. As shown, range 144 begins at logical address "X" and has length "L." The storage object 142 in range 144 may be a LUN (Logical storage UNit), VVOL (virtual machine volume), or file system, for example. The mapping manager 150 maps logical addresses maintained by the namespace manager 140 to corresponding RAID addresses, and the RAID system 170 maps the RAID addresses to corresponding locations in storage 180.

The RAID system 170 arranges disk drives in storage 180 into RAID structures. For example, RAID system 170 divides each disk drive into large extents, called "ubers," and groups together ubers from different disk drives to form uber-slices. An "uber-slice" is a collection of ubers that form a RAID configuration. For example, each uber-slice is similar to a conventional RAID group (e.g., a RAID 5 configuration), except that an uber-slice is composed of ubers (large extents) from different disk drives, rather than from entire disk drives. The RAID system 170 further divides each uber-slice into multiple stripes, with each stripe spanning all ubers in an uber-slice. Although sizes may vary, an example uber-slice may be about 1 GB and an example stripe may be about 1 MB. Thus, there are approximately 1000 stripes in each uber-slice. A group of five 1 TB disk drives could thus support 5000 ubers, 1000 uber-slices, and 1,000,000 stripes. In addition, the RAID system 170 may specify a "plan" for each uber-slice, where each plan specifies the particular ubers that make up the respective uber-slice. Over time, the plan for an uber-slice may change, e.g., as disk drives fail and are replaced by spares.

As further shown in FIG. 1, the mapping manager 150 maintains information about stripes, uber-slices, and plans. For example, free stripe list 152 provides a list of free stripes that the RAID system 170 has configured but has not yet written-to, or has written-to but then cleared, such that the slice is empty. Each stripe in the free stripe list 152 is defined by an uber ID, which uniquely identifies a respective uber-slice that contains the stripe, and an offset (Ofst), which provides a location within the respective uber-slice. The uber ID and offset together provide a stripe ID 154, which uniquely identifies the stripe in the data storage system 116.

The mapping manager 150 also maintains active-stripe metadata 160, which tracks information about stripes that are currently in use, i.e., which have been written-to but not subsequently cleared. The active-stripe metadata 160 represents each stripe in a respective entry 162, wherein entries are shown as rows. Each entry 162 includes an Uber ID and an Offset (which together form a Stripe ID 154), as well as a Plan ID and an LBA. The Plan ID uniquely identifies the particular plan that was active for the uber-slice identified by the Uber ID when the stripe recorded in that entry 162 was last written. The LBA (Logical Block Address) provides a logical address of the stripe data within the range 146.

In an example, a first entry 162-0 in the active-stripe metadata 150 has Uber ID "A" and Offset "0," which indicates that the designated stripe is the first stripe in uber-slice A. The Plan ID is "P1," indicating that the plan for uber-slice A was P1 when the stripe was last written. Entry 162-0 also specifies an LBA of "X," which corresponds to the starting location of range 144. Looking further down the list, one can see that entry 162-3 designates plan "P2" for the same uber-slice A, which means that the plan for uber-slice A changed between the write specified in entry 162-0 and the write specified in entry 162-3. The offset (Ofst) of the stripe for entry 162-3 is "3M," identifying this stripe as the fourth stripe in uber-slice A (assuming each stripe is 1 MB). Entry 162-5 shows yet another example. Here, the identified stripe is on a different uber-slice ("B") and was last written with plan a "P1." Plans as labeled in the figures are relative to the respective uber-slices. Thus, plan P1 for entry 162-5 is different from plan P1 of entry 162-0.

The mapping manager 150 also maintains a list of current plans 156. In an example, the list 156 relates Uber IDs to corresponding Plan IDs, where each Plan ID identifies the most recent plan implemented by the RAID system 170 for the respective uber-slice.

In example operation, hosts 110 issue IO requests 112 to the data storage system 116, such as reads and writes directed to the storage object 142. The SP 120 receives the IO requests 112 at the communication interfaces 122 and initiates further processing. Such processing may include associating the reads and writes with logical addresses in the range 144, mapping the logical addresses to RAID addresses, and directing disk drives in the storage 180 to execute the requested reads and writes.

In the course of servicing IO requests 112 from hosts 110, the data storage system 116 may experience a disk drive failure. If the failed disk drive provides ubers to any uber-slices, then the failure will normally require repair of affected uber-slices. In an example, the RAID system 170 detects the disk drive failure and proceeds to replace any ubers derived from the failed disk drive with spare ubers, e.g., from other disk drives, always ensuring that no uber-slice contains more than one uber from the same disk drive (to ensure redundancy). When swapping in the spares, the RAID system 170 also creates new plans for any affected uber-slices. The RAID system 170 sends a notification 172 to the mapping manager 150, informing the mapping manager 150 of one or more uber-slices that now have new plans. The notification 172 may provide the Uber ID of each degraded uber-slice. In some cases, the notification 172 also provides the new plan for each degraded uber-slice, which the mapping manager 150 may store in the current plan list 156.

Upon receiving the notification 172, the mapping manager 150 initiates a selective repair operation. Rather than rebuilding all the contents of the new uber in each affected uber-slice, the selective repair operation instead proceeds at per-stripe granularity, repairing only those stripes that are actually used for storing data and only if the plans with which the stripes were last written are different from the current plans for those stripes.

For example, assume that notification 172 identifies uber-slice A. To perform selective repair for uber-slice A, the mapping manager 150 identifies an entry in the active-stripe metadata 160 for a stripe on uber-slice A, such as entry 162-0. The mapping manager 150 then compares the Plan ID listed for that entry with the current plan for uber-slice A, as provided in the current plans list 156. Here, entry 162-0 identifies plan P1 as the last-written plan but list 156 identifies plan P2. Because the two plans are different, the stripe at entry 162-0 is considered degraded, as one of its stripe elements resides on the failed drive. Accordingly, the mapping manager 150 sends a repair command 174 to the RAID system 170, directing the RAID system 170 to repair the degraded stripe. The RAID system 170 may then proceed by reading the stripe using plan P1 (the plan with which the stripe was last written), applying exclusive-OR or other RAID protocols as needed to rebuild the data previously stored on the failed drive, and then writing that data to a new stripe element on the spare uber that was swapped into uber-slice A. The mapping manage 150 then stores the current plan P2 in place of P1 in the entry 162-0, as P2 is now the plan with which the stripe was last written.

The mapping manager 150 repeats these activities for each entry in the active-slice metadata 160 that identifies a stripe on uber-slice A, e.g., for entries 162-1, 162-2, 162-3, and 162-4. For entries 162-3, and 162-4, the last-written plan is plan P2, which matches the current plan. Thus, the mapping manager 150 does not send any repair instruction 174 for entry 162-3 or entry 162-4, as the corresponding stripes were already written using the current plan.

Once the mapping manager 150 has finished iterating over all entries 162 in the active-stripe metadata 160 for uber-slice A, all entries 162 for uber-slice A have been updated to store the current plan P2 and any previous plans for uber-slice A can be retired. To retire previous plans, the mapping manager 150 sends a retire command 176 to the RAID system 170. In response to receiving the retire command 176, the RAID system 170 removes all previous plans for uber-slice A, leaving only the current plan.

The mapping manager 150 may perform similar acts for any other uber-slices affected by the failing drive. For example, the mapping manager 150 iterates over all entries 162 for each affected uber-slice and repairs each corresponding stripe if its Plan ID differs from the current plan for the respective uber-slice.

Using the selective repair technique as described, only those stripes which store active data which were last written with non-current plans are repaired. Other stripes may be safely ignored. Thus, the overall scope of drive contents subject to RAID repair is greatly reduced, enabling repair operations to complete much faster than with prior approaches, with lower risk of data loss and fewer writes, which can help to reduce wear on flash drives.

Figures 2, 3:
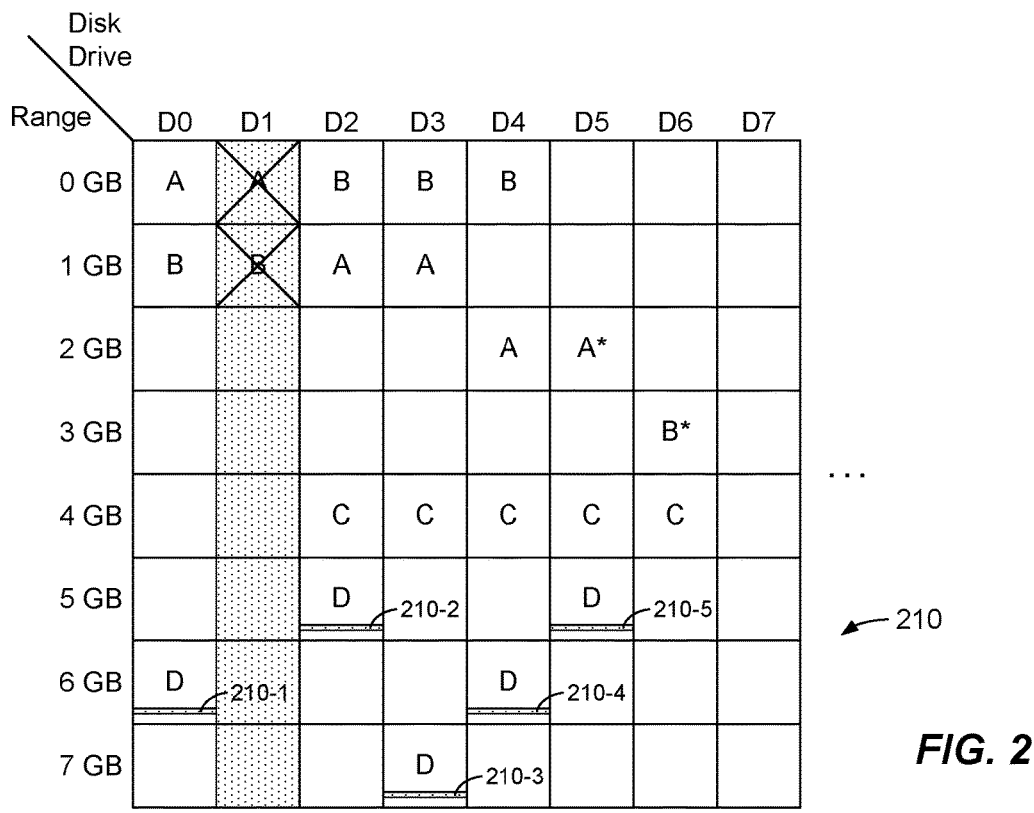
FIG. 2 is a diagram of an example mapped RAID system in which multiple uber-slices are formed, each uber-slice including multiple stripes.
FIG. 3 is a diagram of an example RAID map, which associates uber-slice IDs (identifiers) with respective plan IDs and plans.

FIG. 2 shows an example arrangement of ubers arranged into uber-slices. The diagram shows different disk drive in respective columns and different offset ranges relative to those disk drives in different rows. The intersection of each row with each column describes an uber, which here corresponds to a 1 GB region on a disk drive. Uber-slices in the pictured arrangement contain five ubers each, with each uber provided on a different disk drive (to satisfy the requirement for redundancy). The ubers in uber-slice A are labeled "A," and likewise the ubers in uber-slices B, C, and D are labelled accordingly. Each uber-slice is similar to a conventional RAID group but is composed of respective ubers rather than respective drives. As stated previously, each uber-slice is divided into stripes, with a single example stripe 210 shown for uber-slice D. Stripe 210 includes five stripe elements 210-1 through 210-5, one on each uber of uber-slice D. In a RAID 5 configuration, four of these stripe elements store data and one of them stores parity. Although eight disk drives and eight offset ranges are shown, a typical system will include tens or hundreds of disk drives and thousands of ranges each.

FIG. 2 depicts configurations both before and after a disk drive failure. Here, a failure has occurred in disk drive D1. As D1 contributes ubers to uber-slice A and to uber-slice B, the disk failure leaves uber-slices A and B in a degraded state. Assuming a RAID 5 configuration, the loss of D1 results in a loss of redundancy but not a loss of data, as the data on D1 can be rebuilt from the data at corresponding locations of the other ubers in the respective uber-slices.

In response to the failure of D1, the RAID system 170 replaces the degraded uber in uber-slice A with a spare uber A* from disk D5. The RAID system 170 also replaces the degraded uber in uber-slice B with spare uber B* from disk D6. The RAID system 170 may then create new plans for uber-slices A and B and notify the mapping manager 150 in the manner described previously.

FIG. 3 shows an example RAID map 300, which associates Uber IDs with Plan IDs and corresponding plans. Consistent with FIG. 2, the RAID map 300 shows two plans (P1 and P2) for uber-slice A, two plans (also named P1 and P2) for uber-slice B, and one plan each for uber-slices C and D. Each plan provides an ordered set of ubers that specify a configuration of the respective uber-slice. In an example, the RAID map 300 identifies each uber as a drive-extent coordinate, e.g., as D0-0 for disk drive 0 and range 0 GB. The encircled coordinates 310 indicate differences between plans for an uber-slice. For example, the second uber in uber-slice A changes from D1-0 to D5-2 between plans P1 and P2 Likewise, the second uber in uber-slice B changes from D1-1 to D6-3 between plans P1 and P2 (referenced to uber-slice B).

FIGS. 4-7 show example methods 400, 500, 600, and 700 that may be carried out in connection with the environment 100. The methods 400, 500, 600, and 700 are typically performed, for example, by the software constructs described in connection with FIG. 1, which reside in the memory 130 of the storage processor 120 and are run by the set of processing units 124. The various acts of methods 400, 500, 600, and 700 may be ordered in any suitable way. Accordingly, embodiments may be constructed in which acts are performed in orders different from those illustrated, which may include performing some acts simultaneously.

FIG. 4 shows an example method 400 for performing writes of host data in the data storage system 116 of FIG. 1. The acts specified for writing data in method 400 help to support the efficient RAID repair technique as described herein.

At 410, the data storage system 116 receives an IO request 112 to write a set of data of a specified length at a specified logical address (LA) in a storage object, such as object 142. For example, object 142 may be a LUN, and the IO request 112 may specify a write of 1 MB to logical address 10 MB in the LUN. The "logical address" represents an offset relative to the beginning of the object 142 and is distinguished from a "physical address," which represents a mapped location within the data storage system 116 where the underlying data are stored.

At 420, the namespace manager 140 maps the LA of the object 142, as received in the IO request 112, to a corresponding LBA (Logical Block Address) in the logical address space 146 (FIG. 1). In the example shown, the namespace manager 140 may achieve this mapping by simple addition, i.e., by adding LA=10 MB to the starting position X of the range 144. Thus, the LBA of the host data is simply X+10 MB.

At 430, the namespace manager 140 sends the mapped write request to the mapping manager 150, which receives it and proceeds to allocate a free stripe to accommodate the write. For example, the mapping manager 150 picks up an available free stripe 152a from the free stripe list 152 (FIG. 1). As the free stripe 152a in this example has a length of 1 MB, only one free stripe is needed to accommodate the 1 MB write (greater than one free stripe may be allocated for larger writes). In an example, the data storage system 116 is configured never to perform overwrites. For instance, two consecutive write requests to the same logical address of an object results in the mapping manager 150 allocating two new free stripes, even though the writes are directed to the same location of the object. This policy of always allocating new storage is merely an example, however, as embodiments hereof are not limited to any particular write policy.

At 440, the mapping manager 150 sends an instruction 442 to the RAID system 170 to write the data specified in the IO request 112 to the free stripe 152a (see also FIG. 4a). The instruction may identify the free stripe 152a by Uber ID and Offset, which together form the unique Stripe ID 154 of the free stripe 152a.

One should appreciate that a plan for the free stripe 152a is not yet determined, as the free stripe 152a has not yet been written. This is the case even though the uber-slice of the free stripe 152a is known and the RAID system 170 may already have a plan in place for that uber-slice. Rather, as previously described, the plan for a slice is only determined at the time the stripe is written.

At 450, the RAID system 170 writes the specified data to the free stripe 152a on the specified uber-slice in accordance with the current plan that the RAID system 170 has in place for that uber-slice. The RAID system 170 then sends an acknowledgement 452 of the write instruction 442 back to the mapping manager 150. The acknowledgement 452 includes the Plan ID of the current plan with which the RAID system 170 actually wrote the free stripe 152a (see also FIG. 4a).

At 460, the mapping manager 150 receives the acknowledgement 452 and creates a new entry 162 for the now previously-free stripe 152a in the active-stripe metadata 160. The new entry 162 includes the received Plan ID, as well as the Uber ID and offset of the previously-free stripe 152a. The new entry 162 further includes the LBA of the stripe data, as determined at 420. The previously-free stripe 152a is thus removed from the free stripe list 152 and is instead represented as an active, written-to stripe in the active-stripe metadata 160.

Figure 5:
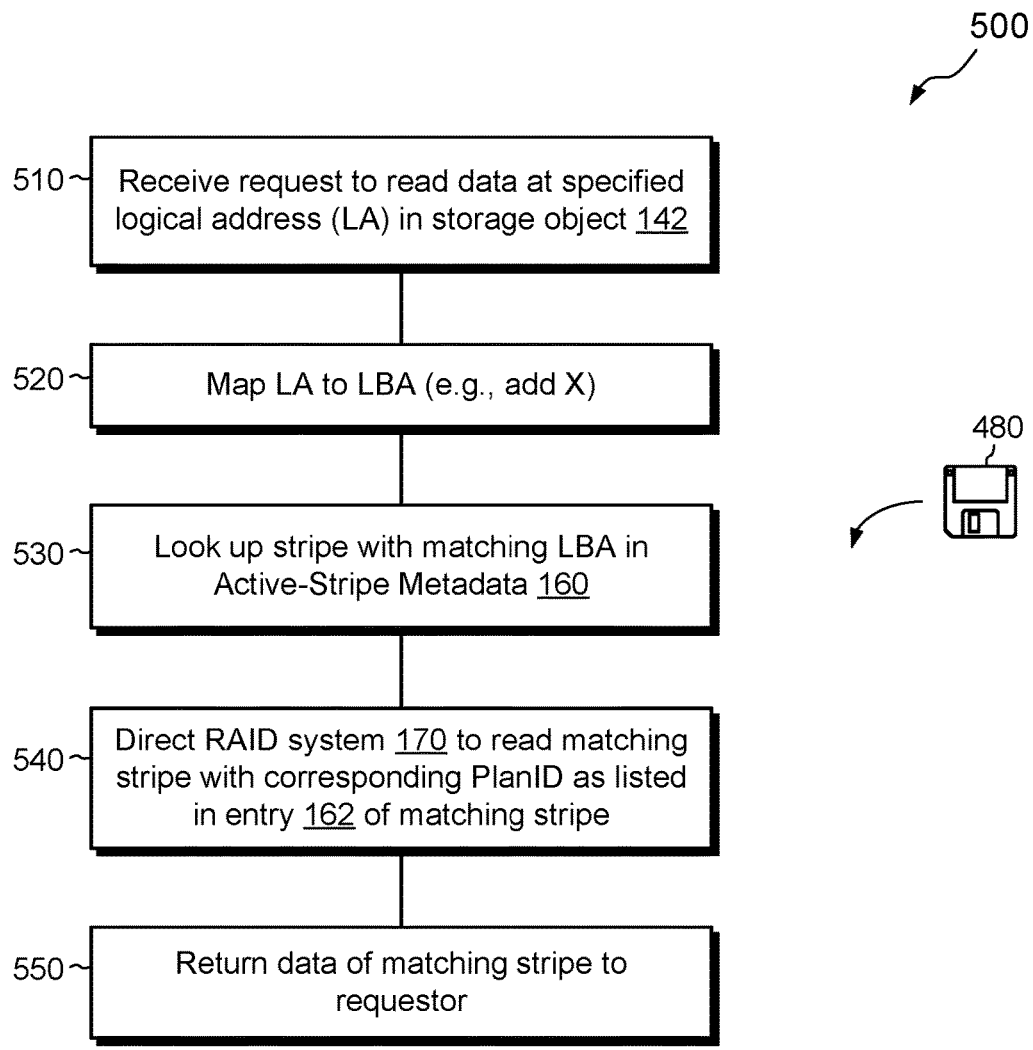
FIG. 5 is a flowchart showing an example method for reading data in the environment of FIG. 1.

FIG. 5 shows an example method 500 for reading host data in the data storage system 116. The method 500 for reading data specifies activities that support the efficient RAID repair technique as described herein.

At 510, the data storage system 116 receives an IO request 112. The IO request 112 specifies a read of host data at a specified logical address (LA) of a specified storage object, such as object 142 (FIG. 1).

At 520, the namespace manager 140 maps the received logical address LA to a corresponding LBA in the logical address space 146, e.g., by calculating the LBA as a sum of LA and the starting address X of the object 142.

At 530, the namespace manager 140 passes the read request with the calculated LBA to the mapping manager 150. The mapping manager 150 proceeds to look up the requested data by accessing the active-stripe metadata 160 and searching for an entry 162 that provides an LBA that matches the LBA calculated at 520.

At 540, the mapping manager 150 directs the RAID system 170 to read the stripe identified in the matching entry 162, using the Plan ID specified in that entry 162, i.e., using the plan that was in place the last time the identified stripe was written.

At 550, the RAID manager 170 executes the read, using the plan specified in the received Plan ID, and returns the data as read from the matching stripe to the mapping manager 150. The data may then propagate up the layers and back to the requesting host 110.

Figure 6:
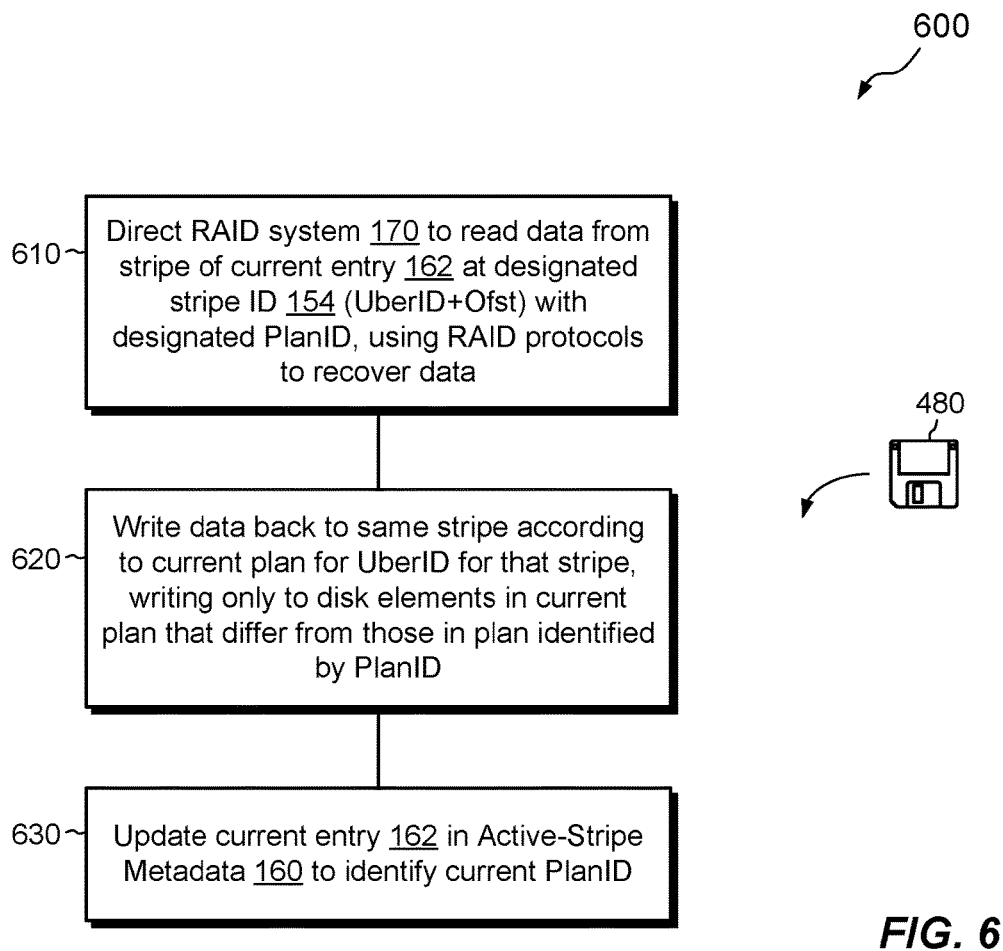
FIG. 6 is a flowchart showing an example method for repairing a stripe.

FIG. 6 shows an example method 600 for repairing a degraded stripe. The method 600 may be performed, for example, by the RAID manager 170 in response to receiving a repair command 174 from the mapping manager 150 (FIG. 1). The method 600 may be repeated for each degraded stripe that the mapping manager 150 has identified in the active-stripe metadata 160, e.g., each stripe on an affected uber-slice that was last written with a plan that differs from a current plan for that uber-slice.

At 610, the RAID system 170 has received a repair command 174. In response, the RAID system 170 reads the identified stripe (based on Uber ID and Offset) according to the last-written plan for that stripe. Even though the stripe is degraded, it is still possible to obtain the contents previously stored on the failed drive by applying RAID protocols, e.g., by accessing a mirror (for mirrored RAID) or by computing a bit-wise exclusive-OR across corresponding locations on the remaining stripe elements (for RAID using parity). The resulting stripe data is thus typically correct even though the RAID system 170 used an obsolete plan to read the stripe data.

At 620, the RAID system 170 writes back a portion of the stripe data it read and reconstructed from the degraded stripe. Assuming there are only two plans for the uber-slice, the portion that the RAID system 170 writes back is only that portion that corresponds to the stripe segment that changed between the last-written plan and the current plan. Thus, the write occurs only to the stripe element contained in the spare uber. No other writes are needed.

Referring briefly back to FIGS. 2 and 3, and assuming that the degraded stripe is part of uber-slice "A," then the RAID manager 170 writes only the portion of stripe data that corresponds to uber A*. The target of the write may be identified by checking the RAID map 300 (FIG. 3) and identifying the coordinates 310 that differ between the last-written plan and the current plan. In this manner, the RAID system 170 determines that only uber D5-2 requires an update.

One should appreciate that circumstances may arise in which an uber-slice has greater than two plans. For example, multiple drives may fail in quick succession, inducing the RAID system 170 to create multiple new plans. Also, the RAID system 170 may reconfigure its storage to improve efficiency, e.g., as part of a background process. In such cases, the RAID system 170 may direct writes of multiple portions of stripe data to respective ubers of the current plan that differ from corresponding ubers of the last-written plan.

Figure 7:
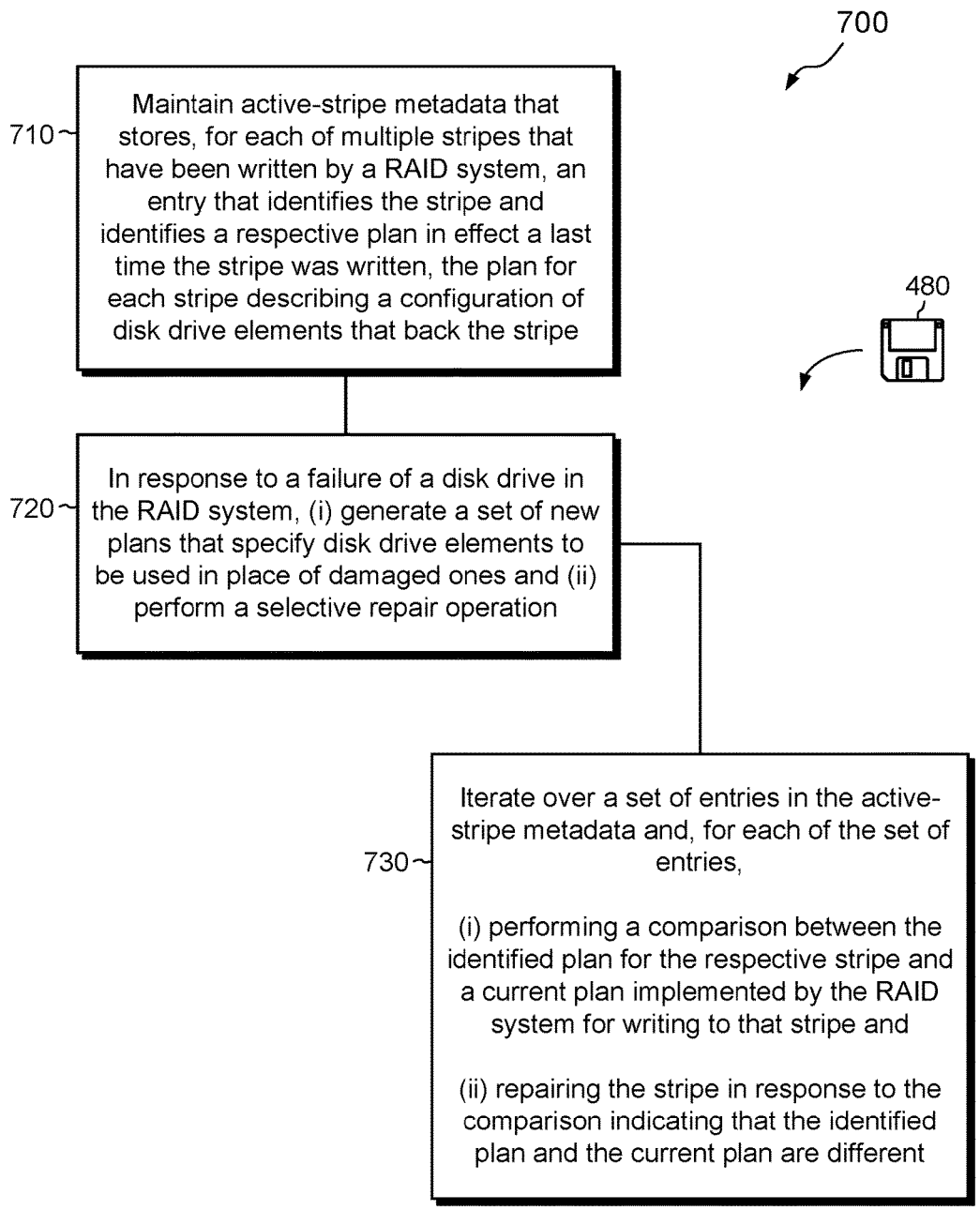
FIG. 7 is a flowchart showing an example method for managing RAID storage.

FIG. 7 shows an example method 700 for managing RAID storage and provides a summary of aspects of the activities described above.

At 710, active-stripe metadata 160 is maintained. The active-stripe metadata 160 stores, for each of multiple stripes that have been written by the RAID system 170, an entry 162 that identifies the stripe and identifies a respective plan (Plan ID) in effect a last time the stripe was written. The plan for each stripe describes a configuration of disk drive elements that back the stripe.

At 720, in response to a failure in a disk drive managed by the RAID system 170, a set of new plans are generated that specify disk drive elements to be used in place of damaged ones and a selective repair operation is performed. As shown in 730, the selective repair operation iterates over a set of entries 162 in the active-stripe metadata 160, such as entries 162 corresponding to a particular uber-slice affected by the disk drive failure. For each of the set of entries 162, a comparison is made between the identified plan (Plan ID) for the respective stripe and a current plan (from list 156) implemented by the RAID system 170 for writing to that stripe. The stripe is then repaired in response to the comparison indicating that the identified plan and the current plan are different.

Having described certain embodiments, numerous alternative embodiments or variations can be made. For example, stripes have been shown and described as residing within uber-slices. This is not required, however, as embodiments can be constructed that do not require uber-slices.

Also, examples have been shown and described that involve communication between a RAID system 170 and a mapping manager 150. However, these components may alternatively be provided together in a single structure.

Further, examples have been shown and described which employ a particular arrangement for logical addressing. The disclosed arrangement is merely an example, however, and is not intended to be limiting.

Further, although the current plan list 156 is shown as a data structure residing in the mapping metadata 150, other embodiments may omit the current plan list 156 and instead obtain current plans as needed on demand via calls to the RAID system 170.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 480 in FIGS. 4-7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing RAID (Redundant Array of Independent Disks) storage, the method comprising:
    maintaining active-stripe metadata that stores, for each of multiple stripes that have been written by a RAID system, an entry that identifies the stripe and identifies a respective plan in effect a last time the stripe was written, the plan for each stripe describing a configuration of disk drive elements that back the stripe; and
    in response to a failure in a disk drive managed by the RAID system, (i) generating a set of new plans that specify disk drive elements to be used in place of damaged ones and (ii) performing a selective repair operation,
    the selective repair operation iterating over a set of entries in the active-stripe metadata and, for each of the set of entries, (i) performing a comparison between the identified plan for the respective stripe and a current plan implemented by the RAID system for writing to that stripe and (ii) repairing the stripe in response to the comparison indicating that the identified plan and the current plan are different,
    wherein each stripe listed in the active-stripe metadata is part of an uber-slice that includes multiple stripes, and wherein the method further comprises providing an uber-slice identifier in each of the set of entries in the active-stripe metadata, each uber-slice identifier uniquely identifying the uber-slice that contains the respective stripe.

2. The method of claim 1, wherein maintaining the active-stripe metadata is performed by a mapping manager that communicates with the RAID system, and wherein performing the selective repair operation operates in response to the mapping manager receiving a notification, from the RAID system, that identifies an uber-slice for which a new plan has been generated.

3. The method of claim 2, wherein the set of entries over which the selected repair operation iterates is limited to entries that identify an uber-slice that matches the uber-slice identified in the notification.

4. The method of claim 2, wherein the RAID system provides plans on a per-uber-slice basis, and wherein the method further comprises, after iterating over all of the set of entries for the uber-slice identified in the notification, sending, by the mapping manager, a command to the RAID system to retire all plans stored for the uber-slice identified in the notification except the current plan for that uber-slice.

5. The method of claim 2, wherein the RAID system and the mapping manager are parts of a data storage system, and wherein the method further comprises:
    receiving, by the data storage system, a request to write a set of data to a storage object;
    in response to receiving the request, obtaining, by the mapping manager, a free stripe from a free stripe list, the free stripe having associated metadata that identifies an uber-slice that contains the free stripe;
    sending, by the mapping manager, an instruction to the RAID system to write the set of data to the free stripe within the identified uber-slice;
    receiving, by the mapping manager in response to the instruction, a plan identifier of a plan with which the RAID system wrote the set of data to the previously-free stripe; and
    creating, by the mapping manager, a new entry in the active-stripe metadata for the previously-free stripe, the new entry identifying the previously-free stripe, the uber-slice that contains the previously-free stripe, and the plan identifier received in response to sending the instruction.

6. The method of claim 5, wherein creating the new entry in the active-stripe metadata includes storing, as a metadata element in the entry, a logical address, the logical address uniquely identifying a range corresponding to a portion of the storage object to which the set of data is written.

7. The method of claim 1, wherein repairing a stripe identified in an entry of the active-stripe metadata includes:

reading data from the stripe using the plan identified in the entry for that stripe in the active-stripe metadata; and writing at least some of the data back to the stripe using the current plan for that stripe.

8. The method of claim 7, wherein reading the data from the stripe includes applying RAID protocols to reconstruct a portion of the data that was stored on a now-damaged disk drive element.

9. The method of claim 8, wherein writing the data back to the stripe includes:

writing the portion of the data to a disk drive element in the current plan for that stripe, which disk drive element replaced the now-damaged disk drive element; and writing no portions of the data to any disk drive element listed in both the plan identified in the entry for that stripe and the current plan.

10. The method of claim 9, wherein the method further comprises, when writing the data back to the stripe using the current plan for that stripe, updating the entry for that stripe in the active-stripe metadata to indicate the current plan.

11. A data storage system, comprising control circuitry that includes a set of processing units coupled to memory, the control circuitry constructed and arranged to:

maintain active-stripe metadata that stores, for each of multiple stripes that have been written by a RAID (Redundant Array of Independent Disks) system, an entry that identifies the stripe and identifies a respective plan in effect a last time the stripe was written, the plan for each stripe describing a configuration of disk drive elements that back the stripe; and in response to a failure in a disk drive managed by the RAID system, (i) generate a set of new plans that specify disk drive elements to be used in place of damaged ones and (ii) perform a selective repair operation, the selective repair operation configured to iterate over a set of entries in the active-stripe metadata and, for each of the set of entries, (i) perform a comparison between the identified plan for the respective stripe and a current plan implemented by the RAID system for writing to that stripe and (ii) repair the stripe in response to the comparison indicating that the identified plan and the current plan are different, wherein each stripe listed in the active-stripe metadata is part of an uber-slice that includes multiple stripes, and wherein the method further comprises providing an uber-slice identifier in each of the set of entries in the active-stripe metadata, each uber-slice identifier uniquely identifying the uber-slice that contains the respective stripe.

12. A computer program product including a set of non-transitory, computer-readable media having instructions which, when executed by control circuitry of a data storage system, cause the control circuitry to perform a method for managing RAID (Redundant Array of Independent Disks) storage, the method comprising:

maintaining active-stripe metadata that stores, for each of multiple stripes that have been written by a RAID system, an entry that identifies the stripe and identifies a respective plan in effect a last time the stripe was written, the plan for each stripe describing a configuration of disk drive elements that back the stripe; and in response to a failure in a disk drive managed by the RAID system, (i) generating a set of new plans that specify disk drive elements to be used in place of damaged ones and (ii) performing a selective repair operation, the selective repair operation iterating over a set of entries in the active-stripe metadata and, for each of the set of entries, (i) performing a comparison between the identified plan for the respective stripe and a current plan implemented by the RAID system for writing to that stripe and (ii) repairing the stripe in response to the comparison indicating that the identified plan and the current plan are different, wherein each stripe listed in the active-stripe metadata is part of an uber-slice that includes multiple stripes, and wherein the method further comprises providing an uber-slice identifier in each of the set of entries in the active-stripe metadata, each uber-slice identifier uniquely identifying the uber-slice that contains the respective stripe.

13. The computer program product of claim 12, wherein maintaining the active-stripe metadata is performed by a mapping manager that communicates with the RAID system, and wherein performing the selective repair operation operates in response to the mapping manager receiving a notification, from the RAID system, that identifies an uber-slice for which a new plan has been generated.

14. The computer program product of claim 13, wherein the RAID system provides plans on a per-uber-slice basis, and wherein the method further comprises, after iterating over all of the set of entries for the uber-slice identified in the notification, sending, by the mapping manager, a command to the RAID system to retire all plans stored for the uber-slice identified in the notification except the current plan for that uber-slice.

15. The computer program product of claim 12, wherein repairing a stripe identified in an entry of the active-stripe metadata includes:

reading data from the stripe using the plan identified in the entry for that stripe in the active-stripe metadata; and writing at least some of the data back to the stripe using the current plan for that stripe.

16. The computer program product of claim 15, wherein reading the data from the stripe includes applying RAID protocols to reconstruct a portion of the data that was stored on a now-damaged disk drive element.

17. The computer program product of claim 16, wherein writing the data back to the stripe includes:

writing the portion of the data to a disk drive element in the current plan for that stripe, which disk drive element replaced the now-damaged disk drive element; and writing no portions of the data to any disk drive element listed in both the plan identified in the entry for that stripe and the current plan.

* * * * *